US008716908B2

(12) United States Patent
Takeda et al.

(10) Patent No.: US 8,716,908 B2
(45) Date of Patent: May 6, 2014

(54) POWER TOOL

(75) Inventors: Shigeru Takeda, Anjo (JP); Shin Sugiura, Anjo (JP); Tadashi Fukumoto, Anjo (JP); Yoshifumi Morita, Anjo (JP)

(73) Assignee: Makita Corporation, Anjo-shi (JP)

( * ) Notice: Subject to any disclaimer, the term of this patent is extended or adjusted under 35 U.S.C. 154(b) by 177 days.

(21) Appl. No.: 13/061,256

(22) PCT Filed: Sep. 1, 2009

(86) PCT No.: PCT/JP2009/065259
§ 371 (c)(1),
(2), (4) Date: May 24, 2011

(87) PCT Pub. No.: WO2010/026963
PCT Pub. Date: Mar. 11, 2010

(65) Prior Publication Data

US 2011/0227429 A1 Sep. 22, 2011

(30) Foreign Application Priority Data

Sep. 3, 2008 (JP) ................................ 2008-226534

(51) Int. Cl.
*H02K 7/14* (2006.01)

(52) U.S. Cl.
USPC ................................ 310/50; 310/47; 310/89

(58) Field of Classification Search
USPC ............... 310/50, 89, 47; 451/353, 354, 451; 173/170
See application file for complete search history.

(56) References Cited

U.S. PATENT DOCUMENTS 3,873,796 A * 3/1975 Worobec, Jr. ............. 200/332.2
4,879,438 A * 11/1989 Winchester ............... 200/61.85
5,595,532 A 1/1997 McCracken
6,120,362 A * 9/2000 Etter et al. ................... 451/354

(Continued)

FOREIGN PATENT DOCUMENTS

DE 10 2006 048 315 A1 4/2008
EP 1 724 057 A2 11/2006

(Continued)

OTHER PUBLICATIONS

Apr. 12, 2011 International Preliminary Report on Patentability issued in International Patent Application No. PCT/JP2009/065259 (with translation).

(Continued)

*Primary Examiner* — Quyen Leung
*Assistant Examiner* — Naishadh Desai
(74) *Attorney, Agent, or Firm* — Oliff PLC

(57) ABSTRACT

A power tool in the form of an electric disc grinder has a driving motor for driving a grinding wheel that performs a grinding or polishing operation on a workpiece, a motor housing that houses the driving motor, a rear cover that is mounted to a rear end region of the motor housing and forms together with the motor housing a grip to be held by a user, and a power switch including an operating lever that extends longitudinally on both of the motor housing and the rear cover and is operated by gripping with a user's hand, and a switch part that is disposed within the rear cover and actuated by operation of the operating lever to control energization of the driving motor and connected to the operating lever through an opening.

3 Claims, 4 Drawing Sheets

(56) References Cited

U.S. PATENT DOCUMENTS

| | | | | |
|---|---|---|---|---|
| 6,296,427 | B1 * | 10/2001 | Potter et al. | 408/124 |
| 6,595,196 | B2 * | 7/2003 | Bath | 125/13.01 |
| 8,069,572 | B2 | 12/2011 | Dreher | |
| 2002/0045415 | A1 * | 4/2002 | Bath | 451/449 |
| 2003/0190877 | A1 * | 10/2003 | Gallagher et al. | 451/344 |
| 2006/0276114 | A1 * | 12/2006 | Gallagher et al. | 451/344 |
| 2007/0296286 | A1 * | 12/2007 | Avenell | 310/50 |

FOREIGN PATENT DOCUMENTS

| | | |
|---|---|---|
| JP | U-56-171186 | 12/1981 |
| JP | A-61-249262 | 11/1986 |
| JP | A-1-210255 | 8/1989 |
| JP | U-7-33580 | 6/1995 |
| JP | A-2006-315172 | 11/2006 |
| RU | 2006 127 410 A | 2/2008 |
| SU | 1126418 A | 11/1984 |
| WO | WO 99/38631 | 8/1999 |
| WO | WO 2005/063451 | 7/2005 |

OTHER PUBLICATIONS

International Search Report dated Nov. 10, 2009 in corresponding International Application No. PCT/JP2009/065259 (with translation).

Oct. 8, 2013 Office Action issued in Russian Patent Application No. 2011 112 792 (with English translation).

European Search Report for European Patent Application No. EP09811489.5, mailed on May 23, 2013.

* cited by examiner

POWER TOOL

FIELD OF THE INVENTION

The invention relates to a hand-held power tool, and more particularly, to a technique for providing a hand-held power tool which performs a predetermined operation on a workpiece by a tool bit.

BACKGROUND OF THE INVENTION

Japanese Utility Model non-examined laid-open Publication No. H07-33580 discloses a hand-held power tool. This known power tool performs a predetermined operation on a workpiece by a tool bit and has a rear cover which is designed to be held by a user and disposed on a rear end region of a housing in which a motor is housed, on the opposite side from a tool bit mounting part. An operating part which is operated to drive the motor is disposed on the rear cover. With such a construction, the user operates the operating part while holding the rear cover in order to drive the motor to perform the operation. In designing a power tool of this type in which the user operates the operating part while holding a grip such as the rear cover, it is required to provide a technique for enhancing ease of operation of the operating part.

SUMMARY OF THE INVENTION

Object of the Invention

Accordingly, it is an object of the invention to provide a technique for enhancing ease of operation of an operating part which is disposed on a grip provided on a rear end region of a motor housing on the opposite side from a tool bit mounting part, in a power tool which performs a predetermined operation on a workpiece by a tool bit.

Means for Achieving the Object

Above-object is achieved by the claimed invention. A power tool according to the invention is configured as a hand-held power tool and includes at least a driving motor, a motor housing, a tool bit mounting part, a rear cover and a power switch. The power tool according to the invention may be typically represented by an electric disc grinder which performs a grinding or polishing operation on a workpiece. Further, the power tool may include an electric grinding or polishing tool, such as a sander or a polisher, an angle drill to be used for screw tightening operation, a reciprocating saw to be used for cutting operation on a workpiece, and a pneumatic power tool in which a tool bit is driven by an air motor.

The driving motor is configured as a motor for driving a tool bit that performs a predetermined operation on a workpiece. The tool bit driven by the driving motor works on the workpiece so that the predetermined operation is performed. Further, the "tool bit" typically represents a grinding wheel or a blade which performs a grinding or polishing operation on a workpiece, but it also includes a sanding disc or a wire brush. Further, the tool bit may be designed as a component of the power tool or it may be designed as a separate component from the power tool, as necessary. The motor housing is configured as a housing for housing the driving motor. The tool bit mounting part is configured as a section to which the tool bit is attached in a housing front end region of the motor housing. The rear cover includes at least a cylindrical part and an opening. The cylindrical part is a covering which is mounted to a housing rear end region of the motor housing on the opposite side from the tool bit mounting part. The cylindrical part is preferably formed in one piece in order to reduce the number of parts or to ensure its adequate strength by the one-piece structure. The opening is formed in a wall of the cylindrical part. The rear cover together with the motor housing forms a grip to be held by the user.

The power switch includes at least an operating part and a switch part. The operating part extends longitudinally on both of the motor housing and the rear cover and is operated by gripping with a user's hand. Specifically, the elongate operating part extends across the motor housing and the rear cover which both also serve as the grip, along their lengths. The operating part may be configured as a rotating lever which is turned around a predetermined pivot when operated, or it may be configured as a parallel moving lever which moves in parallel or a sliding lever which slides when the switch is operated. When the operating part is of a rotating type, the pivot for the operating part may be provided on the motor housing or on the rear cover. The switch part is disposed within the rear cover and actuated by operation of the operating part to control energization of the driving motor. Further, the switch part is connected to the operating part through the opening.

With the above-described construction of the power tool according to this invention, on the grip formed by the rear cover and the motor housing, the operating part which is operated by gripping with one or both hands of the user is arranged to extend longitudinally on both of the motor housing and the rear cover, so that the operating part can be operated in a wider range of the power tool. Therefore, ease of operation of the operating part can be enhanced.

In a further power tool according to this invention, preferably, the cylindrical part has extending walls which are formed at its both ends in a longitudinal direction of the power tool and extend in a direction transverse to the longitudinal direction, and the opening is defined between the extending walls. Specifically, the opening is formed not to extend to either end of the cylindrical part in the longitudinal direction. With such a construction, the extending walls serve as a reinforcing part of the cylindrical part, so that adequate strength of the rear cover itself can be ensured.

In a further power tool according to this invention, preferably, the motor housing has a pivot for the operating part and the operating part is turned around the pivot by gripping with the user's hand. Thus, the operating part having the pivot on the motor housing is provided.

According to the representative power tool which performs a predetermined operation on a workpiece by a tool bit, particularly, an operating part which is operated by gripping with a user's hand extends longitudinally on both of a motor housing and a rear cover. Further, a switch part is disposed within the rear cover formed by a cylindrical part and connected to the operating part through an opening formed in a wall of the cylindrical part. With such a construction, ease of operation of the operating part can be enhanced.

DETAILED DESCRIPTION OF REPRESENTATIVE EMBODIMENT OF THE INVENTION

A representative embodiment of a power tool according to the invention is described with reference to FIGS. 1 to 5. In this embodiment, a hand-held electric disc grinder which performs a grinding or polishing operation on various kinds of workpiece such as metal, concrete or stone by using a disc-like tool bit, is explained as a representative example of the power tool according to the invention.

Figure 1:
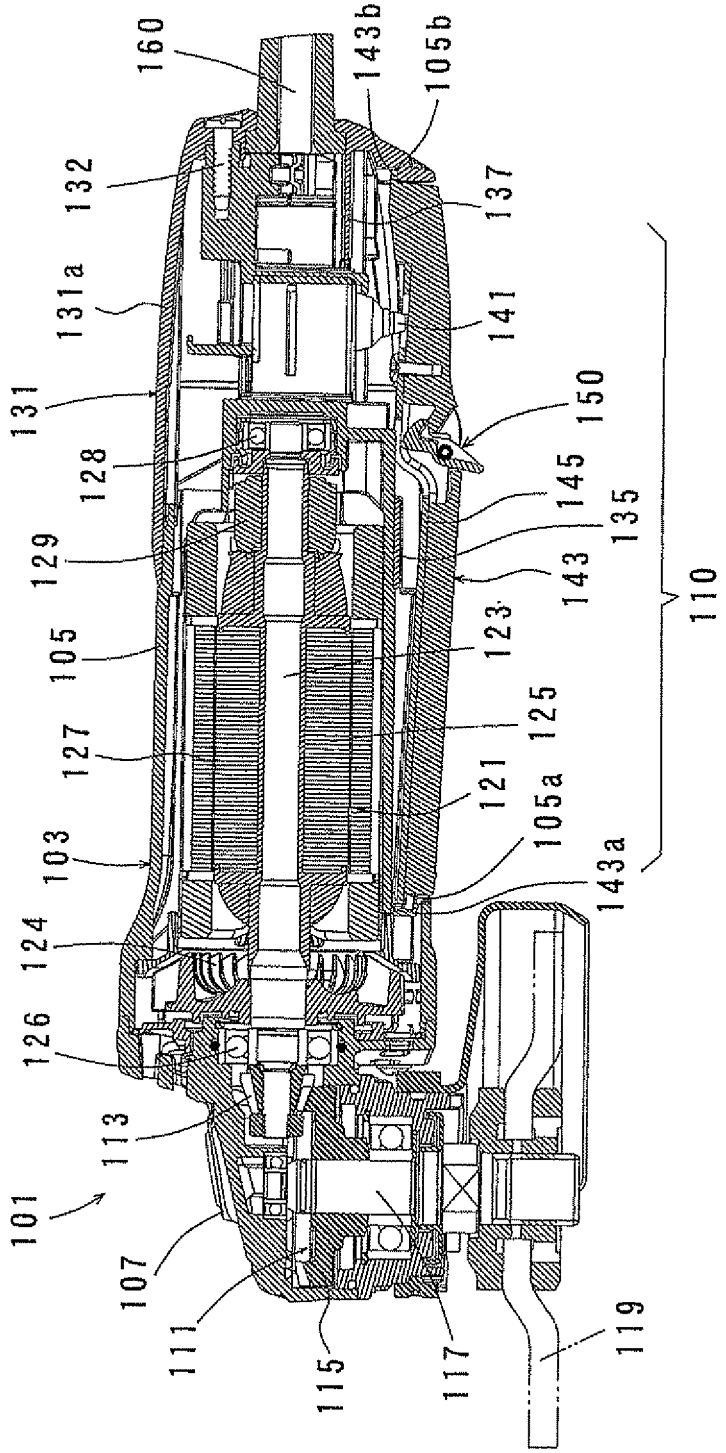
FIG. 1 is a sectional side view showing an entire structure of an electric disc grinder 101 according to the embodiment.

FIG. 1 is a sectional side view showing an entire structure of an electric disc grinder 101 according to this embodiment. As shown in FIG. 1, the electric disc grinder 101 according to this embodiment includes a body 103 that forms an outer shell of the grinder (tool housing). The body 103 mainly includes a motor housing 105, a gear housing 107 and a rear cover 131. A grinding wheel 119 which performs grinding or polishing operation on a workpiece is disposed in a front (left as viewed in FIG. 1) end region of the body 103. The grinding wheel 119 here is a feature that corresponds to the "tool bit" according to this invention. The electric disc grinder 101 may include the grinding wheel 119 as well as the body 103 as its component, or it may not include the grinding wheel 119 as its component. Further, in this specification, for the sake of convenience of explanation, the side of the grinding wheel 119 of the body 103 (left side as viewed in FIG. 1) is taken as the front and the opposite side (right side as viewed in FIG. 1) as the rear in the longitudinal direction of the body 103.

The motor housing 105 is a cylindrical housing which extends in the longitudinal direction of the body 103 and houses a driving motor 121 within its internal space. Further, the motor housing 105 covers an outer surface of the driving motor 121 in a direction transverse to the longitudinal direction of the body 103 and a rear end surface of the driving motor 121. The motor housing 105 together with the rear cover 131 serves as a grip to be held by a user when the user operates the electric disc grinder 101 to perform an operation. In the motor housing 105 of this embodiment, a housing part for covering the outer surface of the driving motor 121 in the direction transverse to the longitudinal direction of the body 103 and a housing part for covering the rear end surface of the driving motor 121 are formed in one piece, but these housing parts may also be separately formed. The motor housing 105 here is a feature that corresponds to the "motor housing" according to the invention.

The gear housing 107 is designed as a housing which is coupled to a front end of the motor housing 105 and houses a power transmitting mechanism 111 which serves to transmit a rotating output of the driving motor 121 to the grinding wheel 119. The power transmitting mechanism 111 mainly includes a driving-side gear in the form of a small bevel gear 113 which is rotationally driven by the driving motor 121, a driven-side gear in the form of a large bevel gear 115 which is engaged with the small bevel gear 113, and a spindle 117 which rotates together with the large bevel gear 115. The grinding wheel 119 is removably attached to a front end of the spindle 117. The spindle 117 (the power transmitting mechanism 111) here is designed as a tool bit mounting part to which the grinding wheel 119 is attached in a front (left as viewed in FIG. 1) end region of the motor housing 105, and corresponds to the "tool bit mounting part" according to this invention. The grinding wheel 119 mounted to the spindle 117 is disposed at one (front) end in the longitudinal direction of the motor housing 105 (the longitudinal direction of the body 103) such that its axis of rotation extends perpendicularly to an axis of rotation of the driving motor 121.

The driving motor 121 of this embodiment is driven by power which is supplied from a power source (receptacle) via a power cord 160. The driving motor 121 mainly includes an output shaft 123, a cooling fan 124 that rotates together with the output shaft 123, an armature 125 that rotates together with the output shaft 123, a stator 127 fixed to the motor housing 105, a commutator 129 provided on a rear end of the output shaft 123 (on an opposite side from the cooling fan 124), two brushes that are disposed in sliding contact with an outer circumferential surface of the commutator 129 and serve to pass current, and a brush holder that houses the brushes. The driving motor 121 is arranged such that an extending direction of the output shaft 123 coincides with the longitudinal direction of the electric disc grinder 101 or the longitudinal direction of the body 103. The front and rear ends of the output shaft 123 are rotatably supported by front and rear bearings 126, 128, respectively. Further, a rotator comprises the output shaft 123, the armature 125 and the commutator 129. The driving motor 121 here is a driving motor for driving the grinding wheel 119 that performs a grinding or polishing operation on a workpiece, and corresponds to the "driving motor" according to this invention.

The rear cover 131 is a housing part made of synthetic resin which is connected to the rear end of the motor housing 105. The rear cover 131 here is a feature that corresponds to the "rear cover" according to this invention. The rear cover 131 is fastened to the motor housing 105 by a fastening screw 132 with its front end in the longitudinal direction fitted onto the rear end of the motor housing 105. The rear cover 131 together with the motor housing 105 forms a grip 110 to be held by the user. The grip 110 is long enough in the longitudinal direction to be held with user's both hands set one behind the other in the longitudinal direction. The grip 110 here is a feature that corresponds to the "grip" according to this invention.

Further, the rear cover 131 covers the rear end of the motor housing 105, and a switch part 141 for switching the driving motor 121 between energized state (on state) and de-energized state (off state) is housed within the rear cover 131. Further, an operating lever 143 for turning on and off the switch part 141 is provided. The operating lever 143 is provided with a locking member 150 which can lock the operating lever 143. The switch part 141 and the operating lever 143 serve as a power switch for driving the driving motor 121 and form the "power switch" according to this invention. Further, the operating lever 143 and the switch part 141 here are features that correspond to the "operating part" and the "switch part", respectively, according to this invention. The power switch of this type in which the switch part 141 is turned on and off by gripping the operating lever 143 with the user's hand, is also referred to as a so-called "paddle switch".

Figure 2:
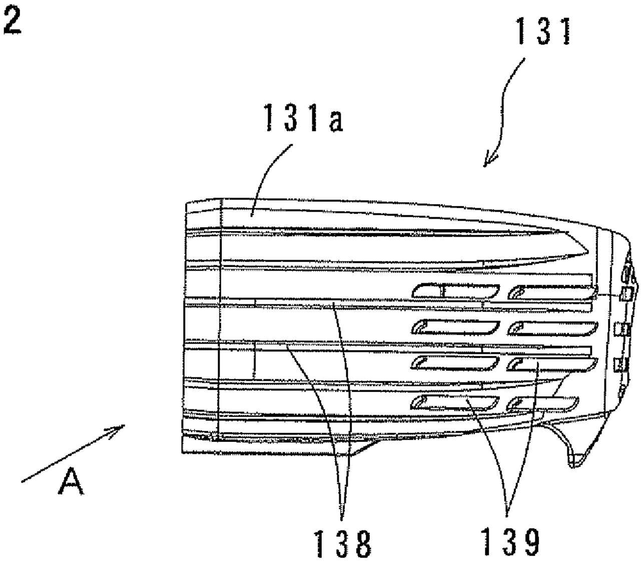
FIG. 2 is a side view showing a rear cover 131 in FIG. 1.

A further detailed construction of the above-described rear cover 131 is now described with reference to FIGS. 2 and 3. FIG. 2 is a side view of the rear cover 131 in FIG. 1, and FIG. 3 is a perspective view of the rear cover 131 as viewed from a direction shown by an arrow A in FIG. 2.

Figure 3:
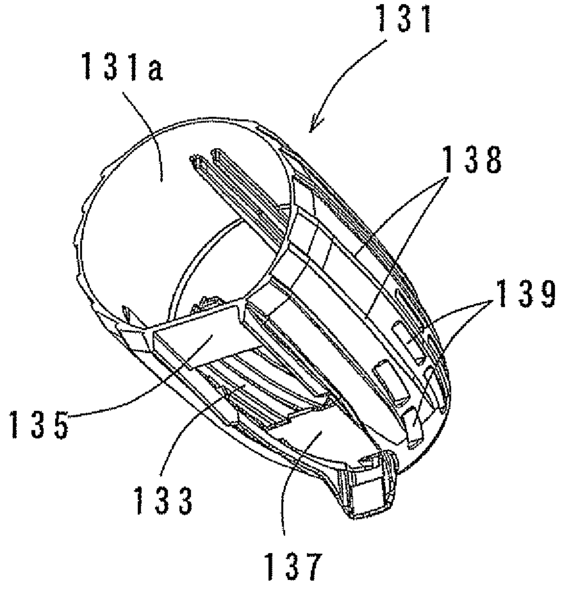
FIG. 3 is a perspective view as viewed from a direction of an arrow A in FIG. 2.

As shown in FIGS. 2 and 3, the rear cover 131 of this embodiment is designed as a cover which is mounted to a rear end region of the motor housing on the opposite side from the tool bit mounting part. The rear cover 131 comprises a cylindrical part 131*a* which is generally cylindrically formed in one piece, and an opening 133 is provided in an underside of the cylindrical part 131*a*. The cylindrical part 131*a* is mounted to the rear (right as viewed in FIG. 1) end of the motor housing 105 on the opposite side from the spindle 117 (the power transmitting mechanism 111). The cylindrical part 131*a* has extending walls 135, 137 at its both ends in the longitudinal direction of the power tool and extend in a direction transverse to the longitudinal direction, and the opening 133 is defined between these extending walls 135, 137. In other words, the opening 133 is formed not to extend to either end of the cylindrical part 131*a* in the longitudinal direction. Here, the cylindrical part 131*a* and the opening 133 are features that correspond to the "cylindrical part" and the "opening", respectively, according to this invention. Further, the extending walls 135, 137 here form the "extending wall" according to this invention.

The extending walls 135, 137 serve as a reinforcing part of the cylindrical part 131*a* and thus have a function of ensuring adequate strength of the rear cover 131 itself. The opening 133 serves to allow connection of the switch part 141 which is disposed within the rear cover 131 (the cylindrical part 131*a*) and the operating lever 143 which is disposed on the outer surface of the rear cover 131 (the cylindrical part 131*a*). With such a construction, the switch part 141 can be connected to the operating lever 143 through the opening 133. Further, the opening 133 also serves as an escape part for allowing rotation of an engagement part 150*b* when the locking member 150 is turned as described below.

Further, a plurality of nonslip ribs 138 are formed on the outer surface of the cylindrical part 131*a* such that they extend along the longitudinal direction of the rear cover 131 or the longitudinal direction of the body 103 and are spaced substantially evenly in the circumferential direction. Further, a plurality of air vents 139 are formed in lateral sides of the cylindrical part 131*a* in order to take in air to cool the driving motor 121.

By provision of the rear cover 131 of this embodiment, or particularly by provision of the cylindrical part 131*a* which is generally cylindrically formed in one piece, the number of parts can be reduced and adequate strength of the rear cover 131 can be ensured by the one-piece structure. Further, for example, in case of a rear cover consisting of two halves, a space for mounting screws and screw bosses must be provided within the rear cover. Therefore, a sufficient interior space for cooling air to flow through may not be ensured so that dust and dirt tend to accumulate in it, and the overall size of the rear cover may increase. The rear cover 131 of this embodiment however can effectively overcome such problems.

Figure 4:
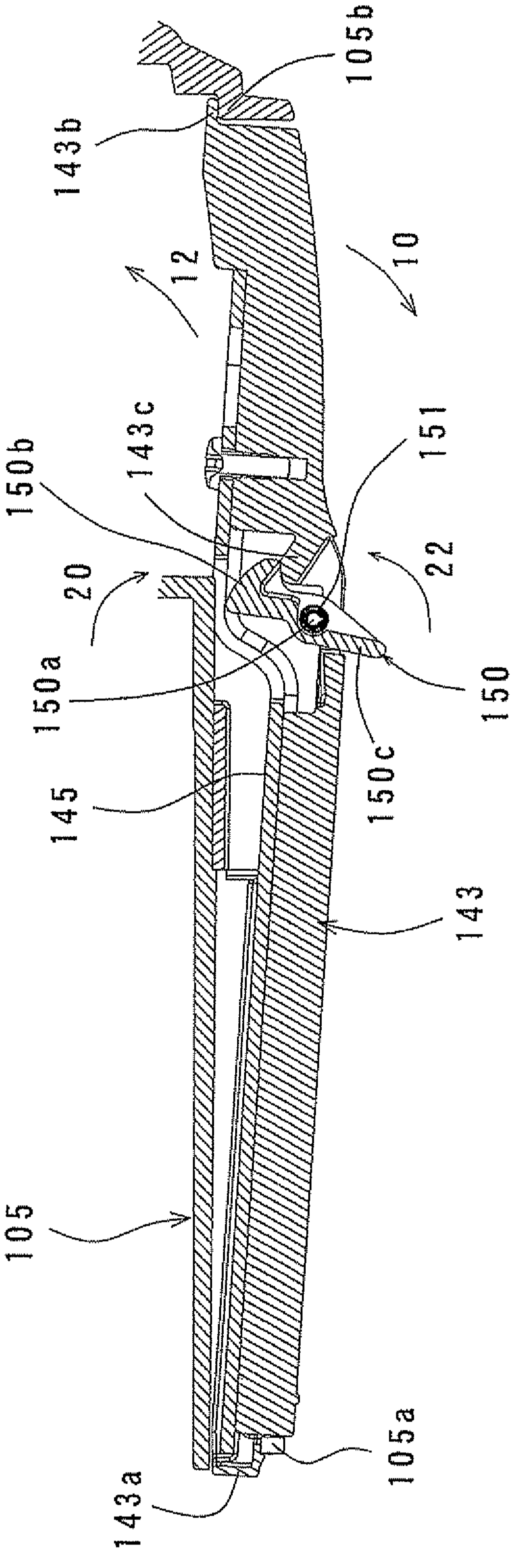
FIG. 4 is a partly enlarged view showing an operating lever 143 in FIG. 1 in a released position.

The detailed constructions of the operating lever 143 and the locking member 150 are now described with reference to FIGS. 4 and 5. FIG. 4 is a partly enlarged view of the operating lever 143 in FIG. 1 which is placed in a released position and FIG. 5 is a partly enlarged view of the operating lever 143 in FIG. 1 which is placed in an operating position.

Figure 5:
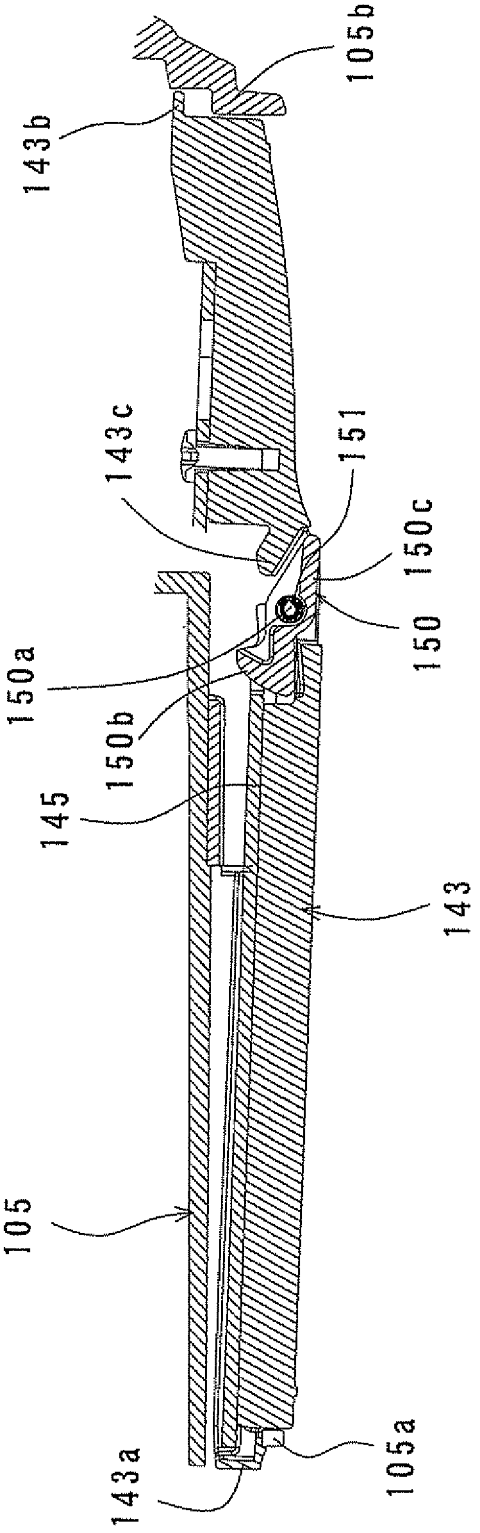
FIG. 5 is a partly enlarged view showing the operating lever 143 in FIG. 1 in an operating position.

As shown in FIGS. 4 and 5, the operating lever 143 of this embodiment is an elongate operating member extending in the longitudinal direction of the body 103 and is arranged to extend longitudinally on both of the undersides of the motor housing 105 and the rear cover 131. Specifically, in this embodiment, the elongate operating lever 143 extends across the motor housing 105 and the rear cover 131 which both also serve as the grip 110, along their lengths. The operating lever 143 has a projecting front end 143*a* and a projecting rear end 143*b* and is mounted to the body 103 (initial state) by engagement (insertion) of the projecting front end 143*a* and the projecting rear end 143*b* into a recess 105*a* of the motor housing 105 and a recess 105*b* of the rear cover 131, respectively. Further, a plate-like reinforcement member 145 is mounted to the operating lever 143 and extends longitudinally along the extending direction of the operating lever 143, so that rigidity of the elongate operating lever 143 can be ensured.

The locking member 150 has an engagement part 150*b* and an operating part 150*c* which are arranged on the opposite sides of a rotating shaft 150*a* mounted on the operating lever 143 side and extend transversely to the rotating shaft 150*a* and in opposite directions from the rotating shaft 150*a*. The locking member 150 is elastically biased in a direction of an arrow 20 in FIG. 4 by a coiled spring member 151 so that it is held in a locked position (shown in FIG. 4). In the state in which the locking member 150 is held in the locked position shown in FIG. 4, the engagement part 150*b* engages with (comes in contact with) a projection 143*c* of the operating lever 143 and is integrally connected to the operating lever 143, so that the locking member 150 is interposed in an operating space of the projection 143*c*. As a result, the operating lever 143 is prevented from rotating (the operating lever 143 is locked). Specifically, when the engagement part 150*b* integrally connected to the projection 143*c* comes in contact with the motor housing 105 side, rotation of the operating lever 143 is prevented. On the other hand, when the operating part 150*c* of the locking member 150 is turned from the locked position in a direction of an arrow 22 shown in FIG. 4 against the elastic biasing force of the spring member 151, the locking member 150 is placed in an unlocked position (shown in FIG. 5). In the unlocked position, the engagement part 150*b* is disengaged from the projection 143*c*, so that the operating lever 143 is allowed to rotate. Therefore, in order to place the operating lever 143 into the operating position, once the locking member 150 must be turned to the unlocked position.

In the initial state, the operating lever 143 shown in FIG. 4 is elastically biased in a direction of an arrow 10 in FIG. 4 by a spring member (not shown) built into the switch part 141 which is held in contact with the operating lever 143, so that the operating lever 143 is held in the released position (shown in FIG. 4). When the operating lever 143 is moved from the released position (shown in FIG. 4) to the operating position (shown in FIG. 5) by gripping operation with user's hand in the unlocked state of the locking member 150, the operating lever 143 is rotated around a pivot (center of rotation) or the front end 143*a* engaged with the recess 105*a*, in the direction of the arrow 12 shown in FIG. 4 against the elastic biasing force of the above-described spring member built into the switch part 141. Specifically, the recess 105*a* and the front end 143*a* form a pivot of the operating lever 143 and form the "pivot" according to this invention. The operating lever 143 of this embodiment is arranged to extend longitudinally on both of the undersides of the motor housing 105 and the rear cover 131, so that the user can operate the operating lever 143 in a wider range on the body 103. Therefore, ease of operation of the operating lever 143 can be enhanced.

When the operating lever 143 is placed into the operating position shown in FIG. 5, the switch part 141 is pressed, so that the switch part 141 is turned on. Therefore, by operating the operating lever 143 to drive the driving motor 121 while holding the grip 110 formed by the motor housing 105 and the rear cover 131, the user can rotationally drive the grinding wheel 119 via the power transmitting mechanism 111 and appropriately perform a grinding or polishing operation or a cutting operation on a workpiece.

On the other hand, when the user's hand is released and thus the operating lever 143 which is once placed in the operating position shown in FIG. 5 is released, the operating lever 143 is rotated around the pivot (center of rotation) or the front end 143*a* in the direction of the arrow 10 shown in FIG.

4 by the elastic biasing force of the above-described spring member built into the switch part 141. As a result, as being returned to the released position shown in FIG. 4, the operating lever 143 is disengaged from the switch part 141 until no longer pressing it so that the switch part 141 is turned off. Therefore, the driving motor 121 is stopped, so that rotation of the grinding wheel 119 via the power transmitting mechanism 111 is stopped. At this time, when the user releases the operating lever 143, the locking member 150 which is once placed in the unlocked position is returned to the locked position shown in FIG. 4 by the elastic biasing force of the spring member 151.

In the above-described embodiment, the operating lever 143 is configured as a rotating lever which is rotated around a predetermined pivot. In this invention, however, an operating part corresponding to the operating lever 143 may be configured as a parallel moving lever or a sliding lever which moves in parallel or slides when the switch is operated. Further, in the above-described embodiment, the pivot of the operating lever 143 is described as being provided on the motor housing 105, but it may be provided on the rear cover 131 as necessary.

Further, in the above-described embodiment, the cylindrical part 131*a* of the rear cover 131 has the extending walls 135, 137 which are formed at its both ends in the longitudinal direction of the power tool and extend in the direction transverse to the longitudinal direction, and the opening 133 is defined between the extending walls 135, 137. In this invention, however, the opening 133 may be formed to extend to the front end of the cylindrical part 131*a* without providing a part corresponding to the extending wall 135, as necessary.

Further, in the above-described embodiment, the electric disc grinder 101 is explained as a representative example of the power tool. This invention, however, can also be applied to other electric power tools which perform a predetermined operation on a workpiece by a tool bit, including an electric grinding or polishing tool, such as a sander or a polisher, an angle drill to be used for screw tightening operation, a reciprocating saw to be used for cutting a workpiece. Further, this invention can also be applied to a pneumatic power tool in which a tool bit is driven by an air motor. In this case, as the tool bit, a grinding wheel or a blade for performing a grinding or polishing operation on a workpiece are typically used, but then a sanding disc or a wire brush can also be used.

DESCRIPTION OF NUMERALS

101 electric disc grinder (power tool)
103 body (tool housing)
105 motor housing
105*a*, 105*b* recess
106 rear housing
107 gear housing
111 power transmitting mechanism
113 small bevel gear
115 large bevel gear
117 spindle
119 grinding wheel (tool bit)
121 driving motor (motor)
123 output shaft
124 cooling fan
125 armature
126 bearing
127 stator
128 bearing
129 commutator
131 rear cover
131*a* cylindrical part
132 fastening screw
133 opening
133, 137 extending wall
138 rib
139 air vent
141 switch part
143 operating lever
143*a* front end
143*b* rear end
143*c* projection
145 reinforcement member
150 locking member
150*a* rotating shaft
150*b* engagement part
150*c* operating part
151 spring member
160 power cord

The invention claimed is:

1. A power tool comprising:

a driving motor for driving a tool bit that performs a predetermined operation on a workpiece, a motor housing that houses the driving motor, a tool bit mounting part to which the tool bit is attached in a housing front end region of the motor housing, a rear cover that includes a cylindrical part which is mounted to a rear end region of the motor housing on the opposite side from the tool bit mounting part, and an opening formed in a wall of the cylindrical part, and forms together with the motor housing a grip to be held by a user, a power switch including an operating lever which is operated by gripping with a user's hand and a switch part which is disposed within the rear cover, the switch part being actuated by operation of the operating lever to control energization of the driving motor and connected to the operating lever through the opening, wherein:

the operating lever extends longitudinally over exterior under surfaces of both the motor housing and the rear cover, the operating lever is attached to the motor housing and the rear cover such that a projecting front end is engaged with a recess of the motor housing and a projecting rear end is engaged with a recess of the rear cover, and the operating lever is held at an initial attaching position before an operation by a spring biasing force of the switch part.

2. The power tool as defined in claim 1, wherein the cylindrical part has extending walls which are formed at its both ends in a longitudinal direction of the power tool and extend in a direction transverse to the longitudinal direction, and the opening is defined between the extending walls.

3. The power tool as defined in claim 1, wherein the motor housing has a pivot for the operating lever and the operating lever is turned around the pivot by gripping with the user's hand.

* * * * *